(12) United States Patent
Wang et al.

(10) Patent No.: US 12,540,936 B2
(45) Date of Patent: Feb. 3, 2026

(54) METHOD AND DEVICE FOR A SAND COLUMN GROUTING FILTRATION EXPERIMENTAL DEVICE

(71) Applicant: Shandong University, Jinan (CN)

(72) Inventors: Dongming Wang, Jinan (CN); Feng Zhang, Jinan (CN); Lei Gao, Jinan (CN); Yang Yu, Jinan (CN)

(73) Assignee: Shandong University, Jinan (CN)

( * ) Notice: Subject to any disclaimer, the term of this patent is extended or adjusted under 35 U.S.C. 154(b) by 323 days.

(21) Appl. No.: 18/244,356

(22) Filed: Sep. 11, 2023

(65) Prior Publication Data

US 2024/0418700 A1    Dec. 19, 2024

(30) Foreign Application Priority Data

Jun. 14, 2023 (CN) .......................... 202310705607.9

(51) Int. Cl.
| | |
|---|---|
| *G01N 33/38* | (2006.01) |
| *G01N 1/00* | (2006.01) |
| *G01N 1/38* | (2006.01) |

(52) U.S. Cl.
CPC ............. *G01N 33/383* (2013.01); *G01N 1/38* (2013.01); *G01N 2001/381* (2013.01)

(58) Field of Classification Search
CPC ...... G01N 33/00; G01N 33/38; G01N 33/383; G01N 1/00; G01N 1/38; G01N 2001/381
See application file for complete search history.

(56) References Cited

FOREIGN PATENT DOCUMENTS

| CN | 111721926 A | * | 9/2020 | ........... G01N 33/383 |
| CN | 108828195 B | * | 10/2020 | ........... G01N 33/383 |
| CN | 115128253 A | * | 9/2022 | ............... G01N 1/36 |

OTHER PUBLICATIONS

Machine Translation of CN-108828195-B (Year: 2020).*
Machine Translation of CN-111721926-A (Year: 2020).*
Machine Translation of CN-115128253-A (Year: 2022).*

* cited by examiner

*Primary Examiner* — Nguyen Q. Ha
(74) *Attorney, Agent, or Firm* — Addison D. Ault; IPGentleman Intellectual Property Services, LLC

(57) ABSTRACT

A sand column grouting filtration experimental device includes a sand column, a grout injection structure connected above the sand column and a grout exit structure connected below the sand column, the sand column comprises a plurality of connecting units; Four screws are provided around the sand column, and the four screws run through the grout injection structure and grout exit structure; A bottom plate is provided below the grout exit structure, a support plate one and a support plate two are provided between the bottom plate and the grout exit structure, and a sand column consolidation structure is provided between the support plate two and the support plate one. An experiment that adopts a segmented combined sand column, in addition to ensuring the experimental results that can be obtained by the general sand column, segmented study of the interception and percolation effect of cement grout in the sand column is implemented.

7 Claims, 8 Drawing Sheets

METHOD AND DEVICE FOR A SAND COLUMN GROUTING FILTRATION EXPERIMENTAL DEVICE

CROSS REFERENCE TO THE RELATED APPLICATIONS

This application is based upon and claims priority to Chinese Patent Application No. 202310705607.9, filed on Jun. 14, 2023, the entire contents of which are incorporated herein by reference.

TECHNICAL FIELD

The invention relates to the technical field of construction engineering, in particular to a sand column grouting penetration experimental device and an application method.

BACKGROUND

Underground grouting is widely used in bridge and tunnel construction projects. In bridge construction, due to the insufficient bearing capacity of foundation, it is sometimes necessary to perform grouting before or after pile foundation construction to improve the bearing capacity of foundation and ensure the safety of bridge operation. Due to the severe overloading situation, bridges running for a long time often face the deterioration of foundation bearing capacity, grouting at the bottom and side of piles is a simple and effective solution for the problem. In tunnel construction, sometimes due to loose underground soil or excessive water content, the excavation face of shield machine will be unstable, and it is difficult to form temporary support surface for subsequent tunnel construction. Grouting is often used to block water and leakage or strengthen the stability of excavation face. In works involving underground, grouting is often used as an effective and recommended means of foundation treatment. Grouting can be divided into chemical grouting and cement-based grouting according to the different materials used. Compared with chemical grouting, cement-based grouting is widely used in geotechnical engineering because of its economic benefits, high durability and good environmental safety.

Different from the true solution state of chemical grouting, the grout of cement-based materials is a suspension, in which tiny particles are suspended in the liquid. When injected into the soil, the skeleton formed by soil particles plays a role as sieve, some cement particles are trapped, attached to the soil skeleton, and gradually accumulate in the soil, changing its nature original properties. The infiltration effect of porous media on particles has a great influence on the construction process and the construction effectiveness of grouting. According to different geological conditions and the purpose of grouting, there are different requirements for the infiltration. For instance, in pile foundation grouting reinforcement, the seepage of cement particles reduces the continuity of cement foundation grouting and has a negative effect on the reinforcement. In the process of tunnel grouting, grout permeates into the soil and dynamically forms filter cake. The quality of filter cake determines the efficiency of support pressure transfer, which controls the stability of tunnel face and ground surface settlement. In tunnel engineering practice, filter cake with low porosity and low permeability is the first choice. Therefore, the key to ensure the effect of grouting is to test the permeability and retention of cement-based grouting materials.

One-dimensional sand column filtration test is a common method to study the filtration phenomenon of cement grout. Sand column generally refers to a sealed pipe filled with sand particles, a conveying device is used to transport cement particles from one end of the pipe, and the transmission of cement particles in the porous medium of sand particles is studied. However, the current test equipment can only study the effect of the sand column on the cement grout filtration and cannot study the detailed cement grout particle percolation at different distances from the grout input port, so the research result data is sometimes insufficient.

In most of the existing sand column experiments, due to the rigidity of the experimental device, the sand column cannot be compressed and consolidated. However, in actual engineering, different soil layers at different depths will have different consolidation conditions under the action of different ground stresses, and consolidation will have an impact on the infiltration of cement grout particles.

SUMMARY

The purpose of the invention is to provide a sand column grouting penetration experimental device and an application method, overcome the measurement limitations of the existing experimental device, especially the result data insufficiency, and invented a new sand column test device to obtain more comprehensive percolation experimental data and lay a foundation for further research.

To realize the above purpose, the invention provides a sand column grouting infiltration experimental device, which comprises a sand column, a grout injection structure connected above the sand column and a grout exit structure connected below the sand column. The sand column comprises a number of connecting units between which a sealed silicone pad is arranged; between the forementioned connecting unit, between the connecting unit and the grout injection structure, the grout effluent structure, flange bolt is used; Four screws are arranged around the sand column, and they run through the grout injection structure and the grout effluent structure, both ends of the four screws are arranged with fixed bolts, bottom plate is arranged beneath the grout effluent structure, two supports plate is put between the bottom plate and the grout effluent structure, between the two support plates, a sand column consolidation structure is arranged.

Preferably, the connecting unit comprises two flange wheel one and two, on each flange wheel, a number of holes for screws are arranged, at the cylindrical side wall between the two flange wheels, prepared holes is set for the wire of sensor; also, there are also holes on the silicone pad, so the connection screws can run through, these holes are denoted as screw hole two.

Preferably, the mentioned grout injection structure comprises the seal plate and another plate that used to form reserved space, in that plate, a number of holes for screw are arranged, these are screw hole three. The plate for reversed space is connected with the forementioned flange three through flange one, the mentioned seal plate had grout injection portal at its central, there are four screw holes at the conner of the seal plate.

Preferably, the forementioned grout filter structure comprises the plate set at the effluent end, and this plate is connected with flange four through flange two, at the central point of the plate at effluent end, through-passage is arranged, and at its four conner, four screw holes two are arranged.

Preferably, the mentioned sand column consolidation structure comprises a compression piston and a grout outlet arranged under the compression piston, the lower part of the grout outlet is connected to the lifting platform, a bottom platform is arranged under the lifting platform, a jack pressure system is arranged between the bottom platform and the lifting platform, an inner rotating arm and an outer rotating arm are set at the front and rear sides of the jack pressure system, the outer rotating arm and the inner rotating arm are connected through a rotating arm bolt shaft; A bottom pulley and a fixing clamp block one are set at both sides of the bottom platform. A top pulley and a fixing clamp block two are set at both sides of the lifting platform, one end of the mentioned inner rotating arm is connected to the mentioned top pulley by pulley shaft one, another end of inner rotating arm is connected to the fixing clamp block one through fixed end bolt one, one end of the mentioned outer rotating arm is connected to the bottom pulley through pulley shaft two, another end of is connected with the fixing clamp block two through fixed end bolt shaft two.

Preferably, the left and right ends of the lifting platform are respectively provided with a steel plate stopper one and steel plate stopper two, a rotating handle is set at the center point of the stopper one, the mentioned rotating handle is connected with the stopper one through lifting platform control shaft one, lifting platform control shaft two is arranged at the center point of steel plate stopper two.

The utility methods relates to a sand column grouting penetration experimental device, which comprises the following steps:

Step 1, according to the requirements of the experiment, certain number of connecting units is selected, combine multiple connecting units through flange bolts and a complete sand column is formed, then connect the grout injection structure, sand column and grout exit structure through flange bolts, the compression piston is placed under the sand column.

Step 2. Place the sand in the sand column, a sensor cable reservation hole is arranged on the connecting unit, place the sensor as required. After placing the sensor, seal the sensor cable reservation hole.

Step 3. Adjust the compression piston to compress and consolidate the sand column. Base on the experimental requirements. There are two modes to control the lifting platform: displacement control mode and force control mode, control the compression of the sand column with set value.

Step 4, use the sealed joint to connect the air compressor, the grout storage device and the grout injection port in turn, install the ball valve on the grout transport pipeline to control the flow of the grout at each step, and check the air tightness;

Step 5, turn the air compressor on, drive the air into the grout storage tank, the cement grout will enter the sand column along the pipe under the action of air pressure;

Step 6, drive the cement grout to penetrate into the sand column, record the sensor and the weight change of the sand column base to the experimental requirements. After the cement grout flow through the exit, use a quantitative container to collect the filter liquid and measure the turbidity of the filter liquid;

Step 7, after the filtration complete, disassembly the connecting unit from top to the bottom, when the connecting unit is removed, use tools to cut of the sand column, and carry on further observation, to investigate the filtration effect of cement grout at different travel distance.

Therefore, the invention adopts the sand column grouting penetration experimental device and application method of the structure, and has the following beneficial effects:

(1) This device comprises the segmented unit-combined sand column, In addition to guaranteeing the experimental results obtained by the general sand column, it can also be used to study the interception percolation effect of cement grout in the sand column.

(2) The connecting unit in this invention is combined through silicone pad and flange bolts, the gas tightness and overall strength of the assembled sand column are ensured, and the error of the experimental results is reduced.

(3) The grout injection structure and the grout exit structure of the invention assemble functions of grout dispersion, input and output of grout, and measuring platform, etc. The flat platform is convenient to place the whole equipment on the weighing platform for weight measurement.

(4) The connecting unit of the invention is provided with a preset port placed for the sensor installation, which can be conveniently sealed by glass glue after installation, and is convenient to measure the gradient distribution and change of various parameters inside the sand column during the test.

(5) The length of the sand column of the invention can be freely determined by changing the number of connecting units, and it is convenient to investigate the filtration effect and its relationship with filtration distance.

(6) The invention realizes two consolidation modes of sand column: displacement control and force control; through the consolidation control device, so that the sand column is more in line with the characteristics of the actual project, The indicative result of experiments to practical engineering is enhanced.

The technical scheme of the invention is further described in detail by the attached drawings and embodiments.

Figure 1:
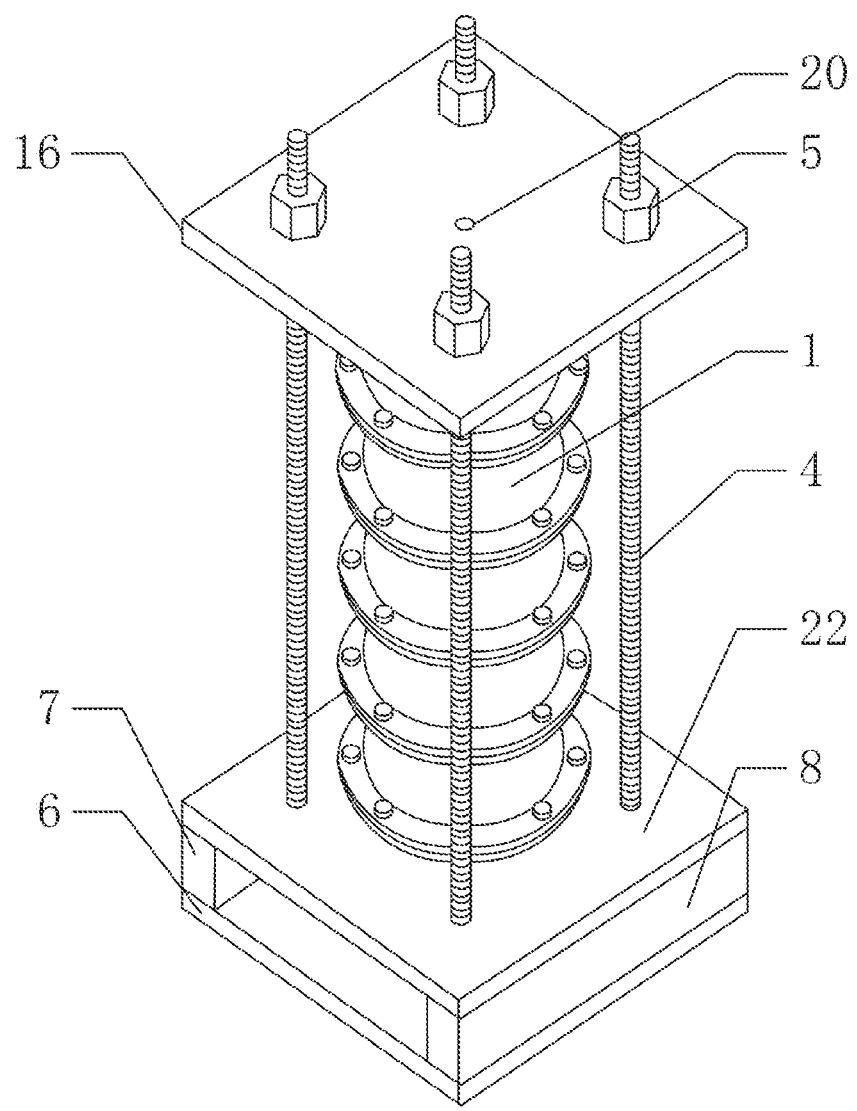
FIG. 1 is the three-dimensional view after assembly of the invention.

Appended drawing reference signs: 1—Connecting unit; 2—Sealing silicone pad; 3—Flange bolt; 4—Screw; 5—Anchor bolt; 6—Bottom platform; 7—Support plate 1; 8—Support plate 2; 9—Installation position of the consolidation structure; 10—Flange bolt 1; 11—Flange bolt 2; 12—Flange bolt hole 1; 13—Side wall panel; 14—Reservation hole for sensor cable; 15—Flange bolt hole 2; 16—Sealing pad; 17—Wall for reversed space; 18; Flange bolt hole 3; 19—Flange bolt 3; 20—Grout injection structure; 21—Reversed hole for screw 1; 22—Platform at grout exit; 23—Flange bolt 4; 24—Through-passage; 25; Reversed hole for screw 2; 26—Compression piston; 27—Grout exit; 28—Lifting platform; 29—Bottom platform; 30—Jack pressure system; 31—Inner rotating arm; 32—Outer rotating arm; 33—Bolt shaft for rotating arm; 34—Bottom pulley; 35—Fixing clamp block 1; 36—Top pulley; 37—Fixing clamp block 2; 38—Pulley axis 1; 39—Screw shaft 1 at the fixing end; 40—Pulley axis 2; 41—Screw shaft 2 at the fixing end; 42—Steel plate stopper 1; 43—Steel plate stopper 2; 44—Rotating handle; 45—Control screw 1 for lifting platform; 46—Control screw 2 for lifting platform; 47—Rubber seal ring; 48—Sidewall of sand column; 49—Installation position for rubber seal ring; 50—Gravel layer.

DETAILED DESCRIPTION OF THE EMBODIMENTS

The technical scheme of the invention is further explained by the attached drawings and embodiments.

Unless otherwise defined, the technical or scientific terms used in the invention shall have the usual meaning understood by persons of general skill in the field to which the invention belongs. The words "first", "second" and similar words used in the present invention do not indicate any order, quantity or importance, but are only used to distinguish different components. A word such as "including" or "comprising" means that the element or object appearing before the word covers the element or object listed after the word and its equivalents, without excluding other components or objects. Similar words such as "connection" or "link" or "joint" are not limited to physical or mechanical connections, but may include electrical connections, whether direct or indirect. "Up", "down", "left", "right", etc. are only used to represent relative position relationships, and when the absolute position of the described object changes, the relative position relationship may also change accordingly.

Implement Example

Please refer to FIG. 1 to FIG. 18, The present invention provides a sand column grouting penetration experimental device and the application method, including the sand column, the grout injection structure at the top of the sand column, and the grout exit structure at the bottom, the sand column comprises multiple connecting units 1, the sealing silicon pad 2 is arranged at between the connecting units 1, the connection unit 1 and the grout injection structure, the connection unit 1 and the grout exit structure are connected by flange bolt 3; Four screws 4 are arranged around the sand column, four screws 4 run through the grout injection structure and grout exit structure, and both ends of the four screws 4 are provided with fixing bolts 5; The bottom plate 6 is provided below the grout exit structure, the support plate one 7 and the support plate two 8 are provided between the bottom plate 6 and the grout exit structure, and the sand column consolidation structure is arranged between the support plate two 8 and the support plate one 7, and the installation position of the sand column consolidation structure 9 can be seen in FIG. 2.

The connecting unit 1 comprises flange one 10 and flange two 11, flange one 10 and flange two 11 are provided with a plurality of flange bolt holes 12, between flange two 11 and flange one 10 are provided with side wall 13, sensor cable reserved hole 14 is arranged at side wall 13; The sealing silicone pad 2 is provided with a plurality of flange bolt holes two 15.

The grout injection structure comprises a sealing plate 16 and a wall 17 to reserve space below the sealing plate 16, the wall for reversed space 17 is provided with a plurality of flange bolt holes three 18, the wall 17 is connected to the flange one 10 through the flange three 19, the grout injection port 20 is provided at the center position of the sealing plate 16, and four screw reserved holes 21 are provided around the sealing plate 16.

The grout exit structure comprises a effluent-end plate 22 disposed below the connection unit 1, and the effluent-end plate 22 is connected to the flange two 11 through the flange four 23; The central position of the effluent-end plate 22 is provided with a through channel 24, and the peripheral position of the effluent-end plate 22 is provided with four reserved holes for screw 25.

The sand column consolidation structure comprises a compression piston 26 passing through the channel 24 and a grout exit 27 disposed below the compression piston 26, the grout exit 27 also plays a supporting role, the lower part of the grout exit 27 is connected to the lifting platform 28, the bottom platform 29 is provided below the lifting platform 28, the bottom platform 29 and the lifting platform 28 are provided with a jack pressure system 30, the front and rear sides of the jack pressure system 30 are provided with an inner rotating arm 31 and an outer rotating arm 32, The outer rotating arm 32 and the inner rotating arm 31 are connected by the bolt shaft 33; Both sides of the bottom platform 29 are provided with a bottom pulley 34 and a fixing clamp block one 35, the top of both sides of the lifting platform 28 is provided with a top pulley 36 and a fixing clamp block two 37, one end of the inner rotating arm 31 is connected to the top pulley 36 through the pulley shaft one 38, the other end is connected to the fixed clamp block one 35 by the fixed end bolt shaft one 39, one end of the outer rotating arm 32 is connected to the bottom pulley 34 through the pulley shaft two 40, and the other end is connected to the fixing clamp block two 37 by the screw shaft two 41.

The left and right ends of the lifting platform 28 are respectively provided with steel plate stopper one 42 and steel plate stopper two 43, and the central position of the steel plate stopper one 42 is provided with a rotating handle 44, and the rotating handle 44 is connected with the steel plate stopper one 42 through the lifting platform control screw one 45; The central position of the steel plate stopper two 43 is provided with a lifting table control screw two 46.

The application method of sand column grouting filtration experimental device, including the following steps:

Step 1, select certain number of connection unit 1 based on the experimental requirements, combine multiple connection units 1 through flange bolt 3 to form a complete sand column, and then inject the grout into the structure, the sand column and the grout exit structure are connected through flange bolt 3, and the compression piston 26 is placed at the bottom of the sand column;

Step 2, put the sand into the sand column, the connection unit 1 is provided with a reservation hole 14 for sensor cable, as needed to place pore water pressure sensor, earth pressure box and other equipment, after placing the sensor, use glue or other materials to seal the reserved hole 14;

Step 3, according to the experimental requirements, adjust the compression piston 26, compress and consolidate the sand column, and the lifting platform 28 is capable of displacement control mode and force control mode to control the compression of the sand column with the rated value;

Step 4, use the sealing joint to connect the air compressor, the grout storage device and the grout injection port 20 on the sealing plate 16 in turn, install a ball valve on the grout transportation pipeline to control the flow of the grout, and overhaul the gas tightness;

Step 5, turn on the air compressor, drive the air into the grout storage tank, and the cement grout in the tank will enter the sand column along the pipeline under the action of air pressure;

Step 6: Drive the cement grout to infiltrate into the sand column, monitor the sensor value and the change of sand column weight according to the experimental requirements, and collect the filtrate in a quantitative container after the cement grout is filtered through the sand column, and measure the turbidity of the filtrate;

Step 7, after the cement grout seeps through, the injection process ends, the experimental device is disassembled from top to bottom, and during the disassembly process, insert the pad plate into the sand column for segmentation when the segment is separated, and then other follow-up tests are carried out to study the percolation of the cement grout at different diafiltration distances.

Figure 2:
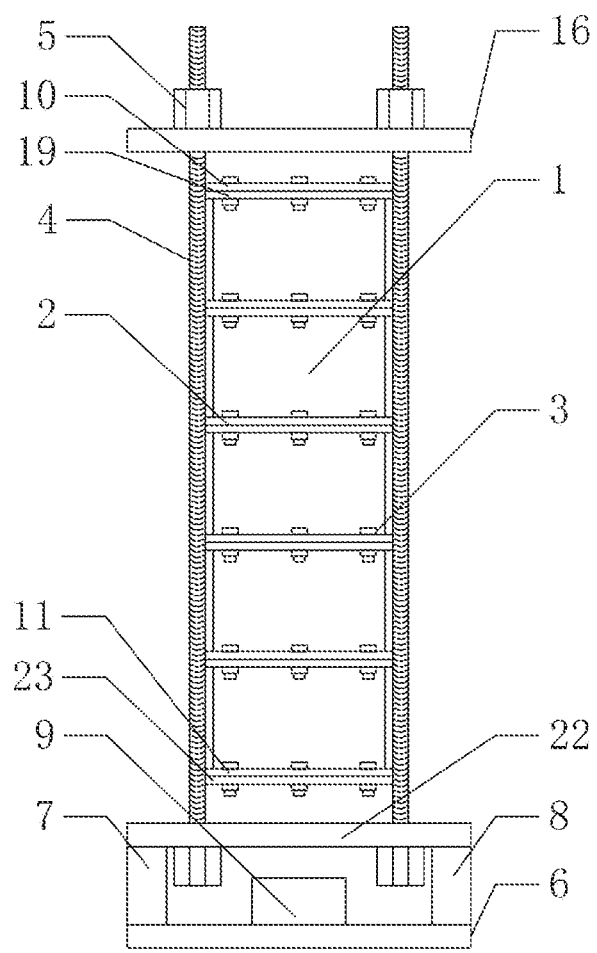
FIG. 2 is the side view after assembly of the invention.
Figure 3:
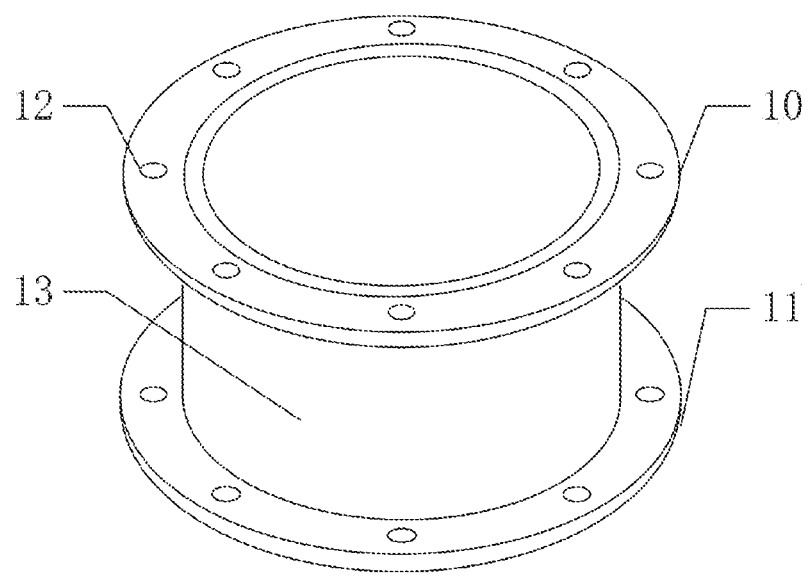
FIG. 3 is the three-dimensional view of connecting unit.
Figure 4:
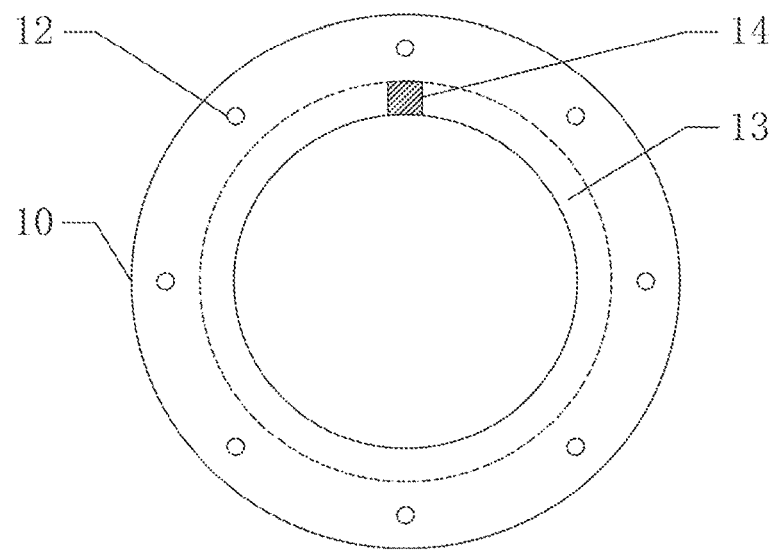
FIG. 4 is the vertical view of connecting unit.
Figure 5:
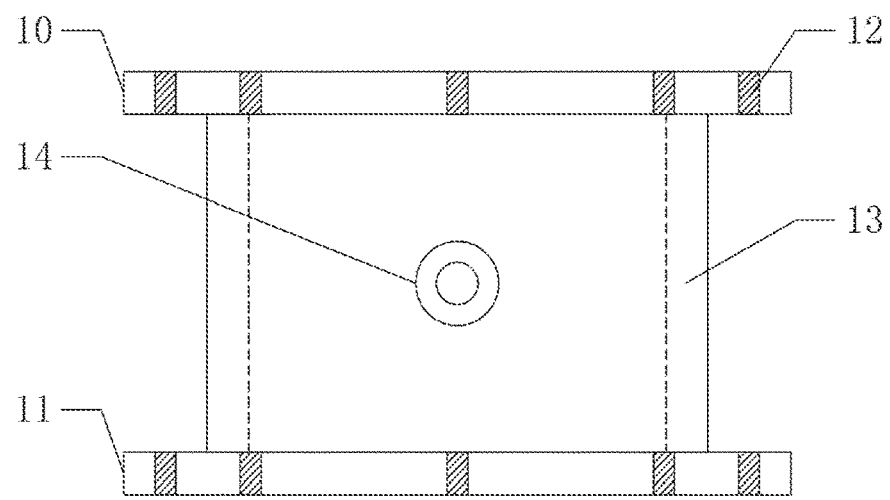
FIG. 5 is the side view of connecting unit.
Figure 6:
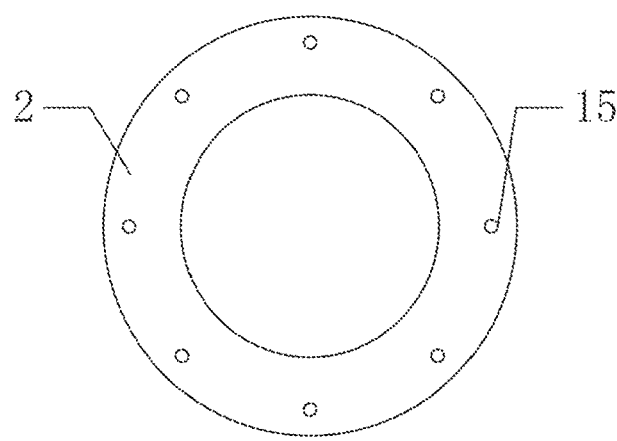
FIG. 6 is the sealing silicone pad between the connecting units of the invention.
Figure 7:
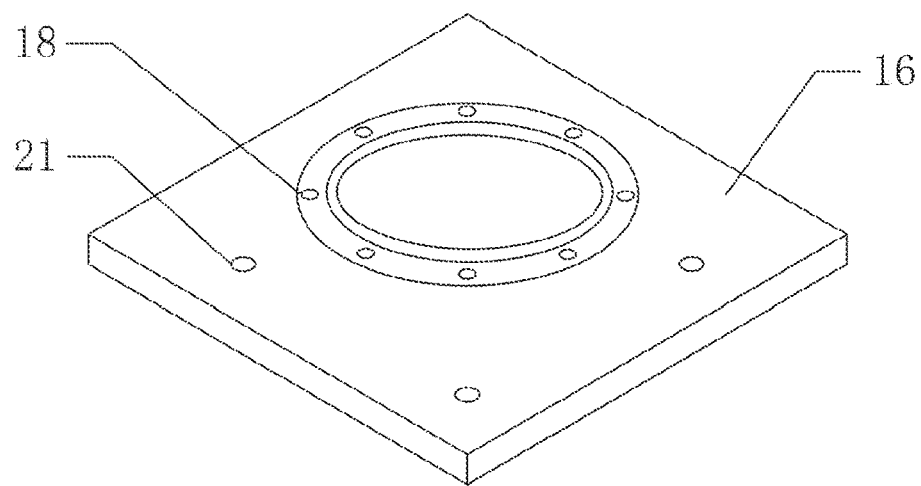
FIG. 7 is the three-dimensional view of grout injection structure.
Figure 8:
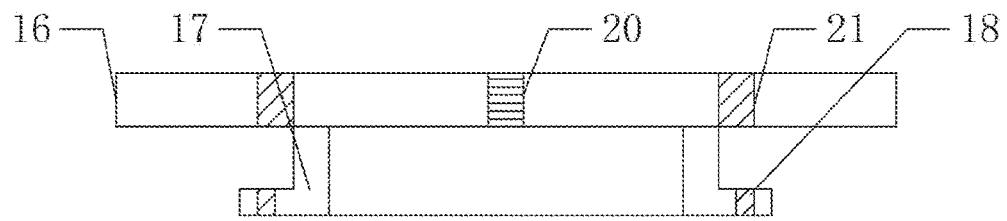
FIG. 8 is the side view of grout injection structure.
Figure 9:
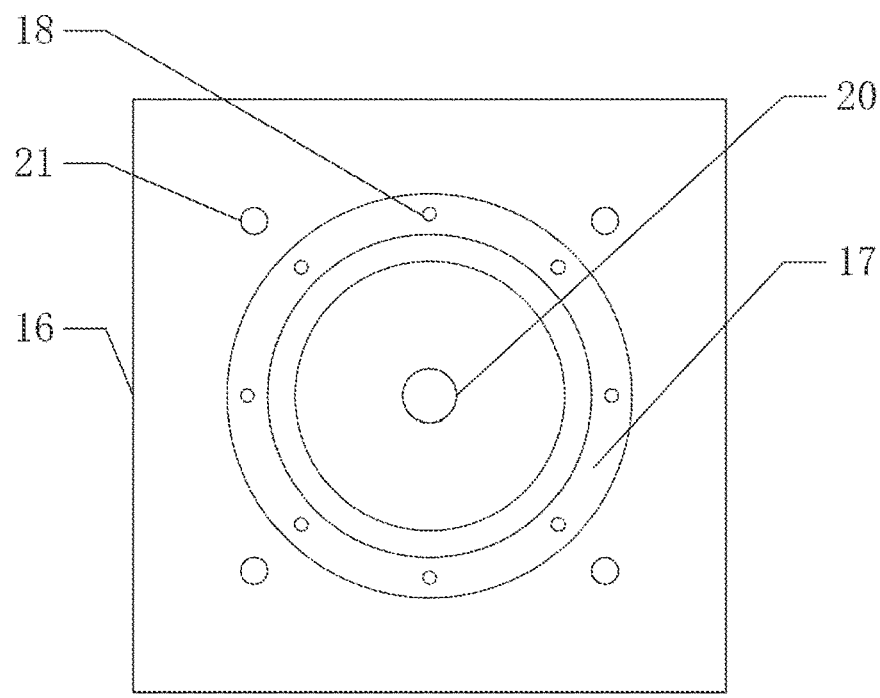
FIG. 9 is the vertical view of grout injection structure.
Figure 10:
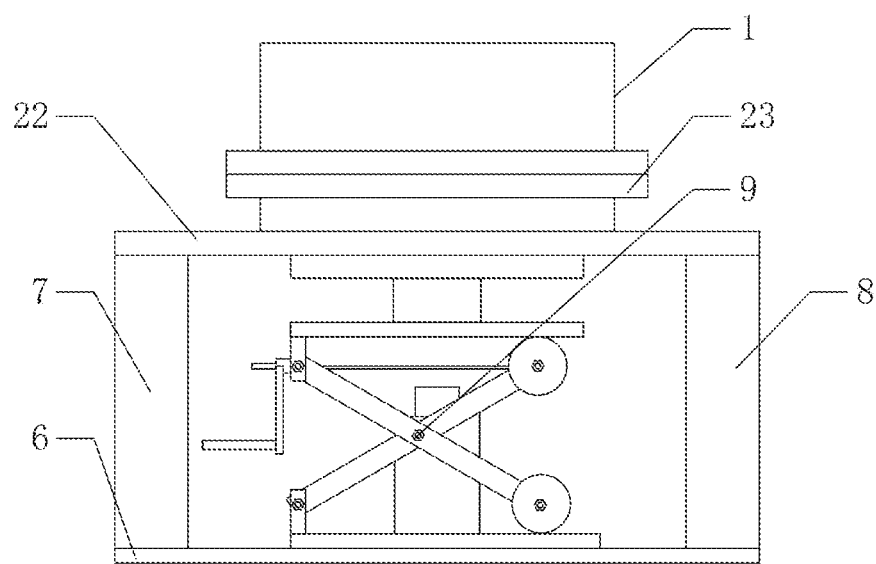
FIG. 10 is the side view of grout exit and consolidation structure.
Figure 11:
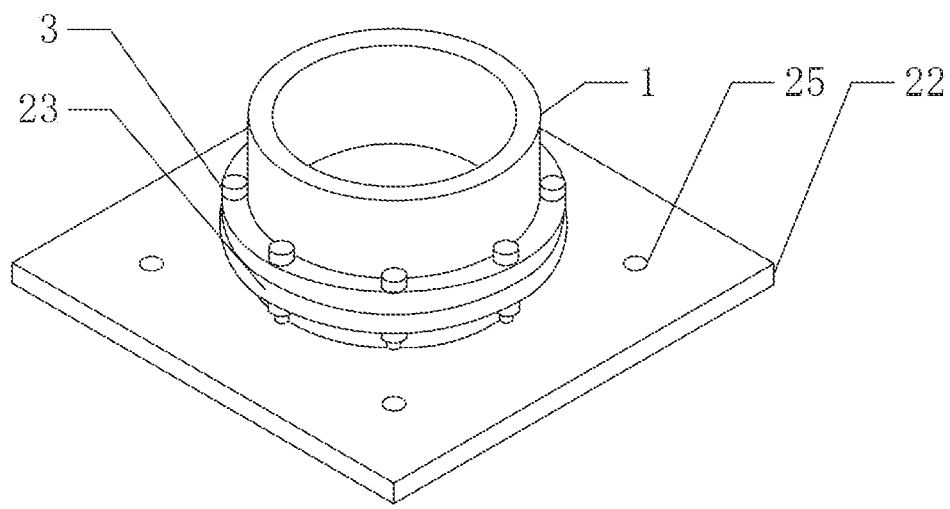
FIG. 11 is the three-dimensional view of the grout exit structure.
Figure 12:
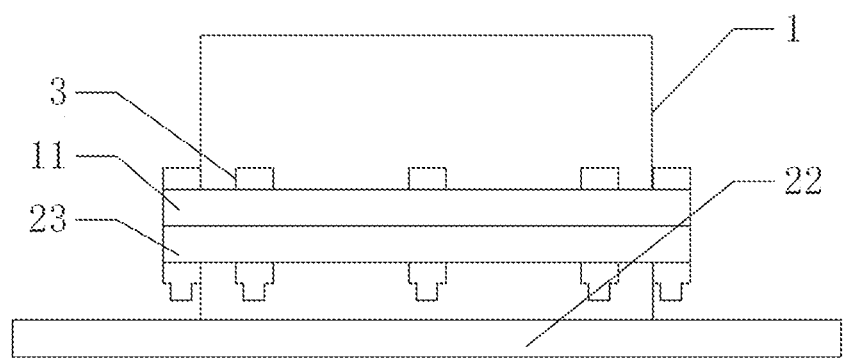
FIG. 12 is the side view of the grout exit structure.
Figure 13:
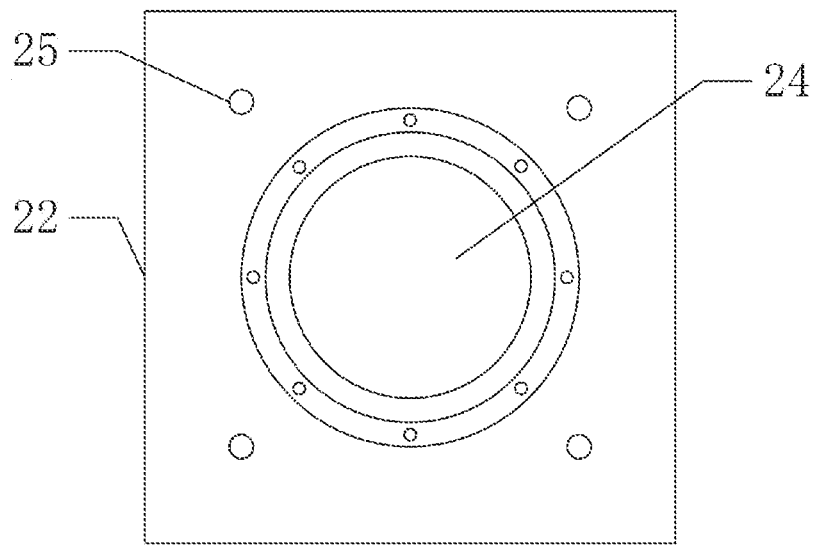
FIG. 13 is the vertical view of the grout exit structure.
Figure 14:
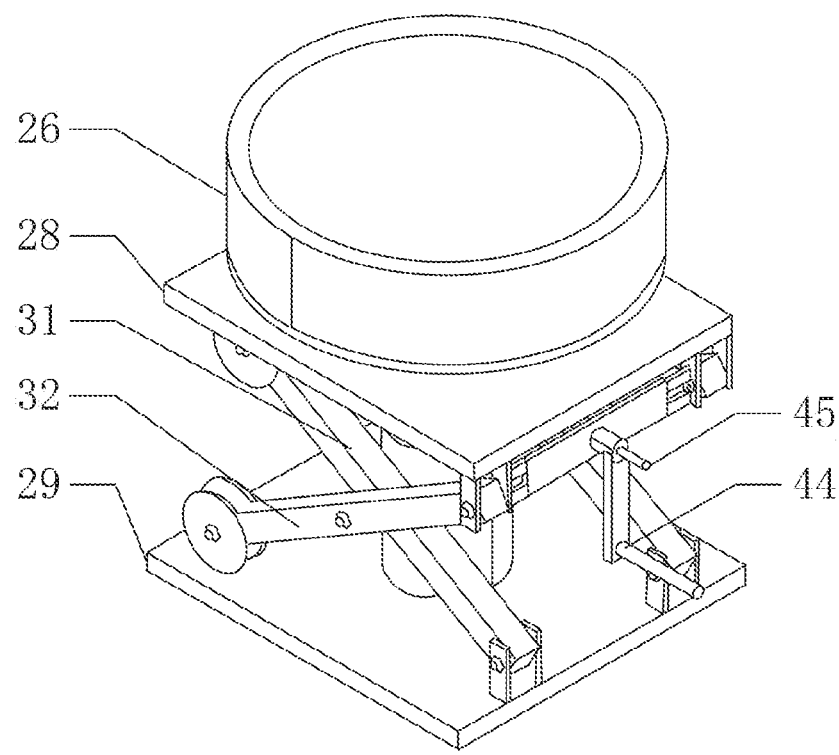
FIG. 14 is the three-dimensional view of the consolidation structure.
Figure 15:
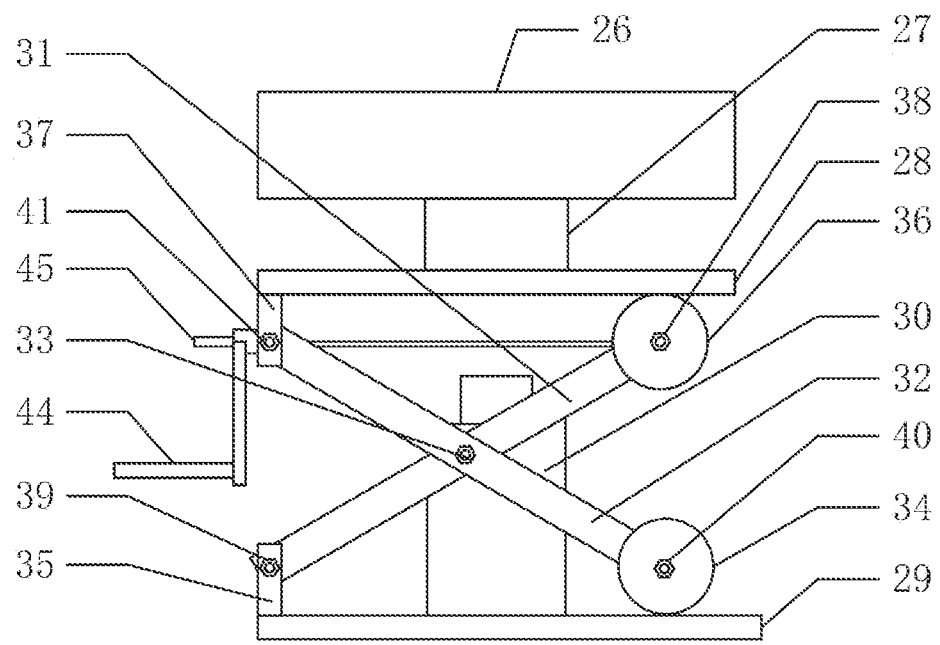
FIG. 15 is the front view of the consolidation structure.
Figure 16:
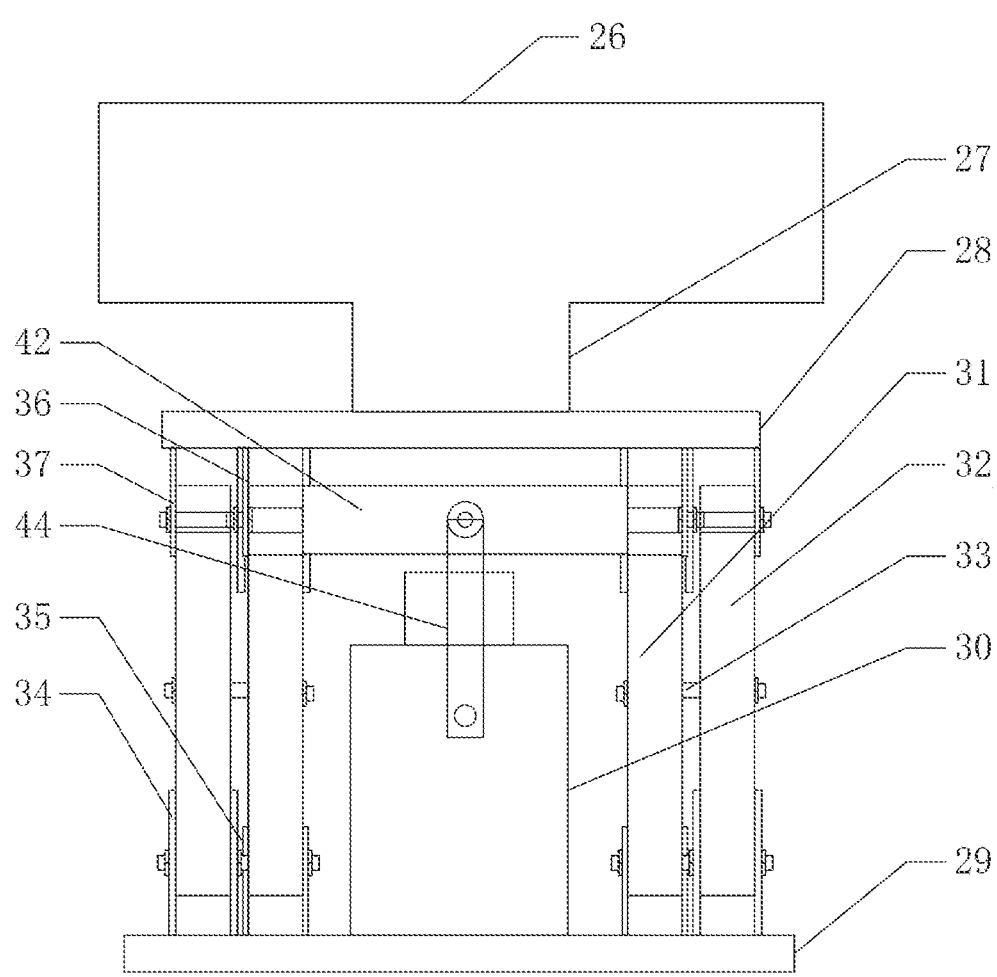
FIG. 16 is the right view of the consolidation structure.
Figure 17:
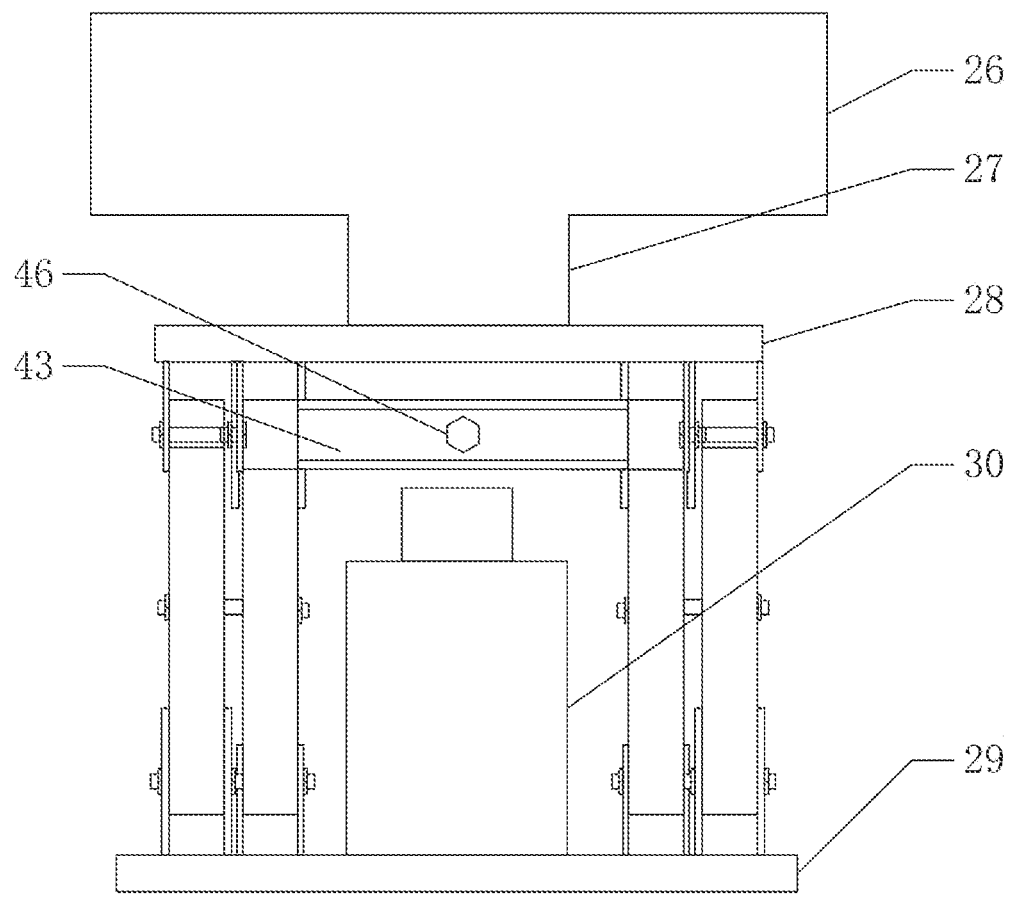
FIG. 17 is the left view of the consolidation structure.

In practical experiments, follow the instruction of FIG. 1 to assemble the connection unit 1, grout injection structure and grout exit structure, the number of connection unit 1 can be adjusted according to the experimental requirements, the four screws 4 connecting the grout injection structure and grout exit structure also need to be adjusted accordingly, between each connection unit 1, the connection unit 1 and the grout injection structure, the connection unit 1 and the grout exit structure are connected by flange bolt 3, and the sealing silicone pad 2 is placed between the flange bolt one 10 and the flange bolt two 11.

First, the grout exit structure is connected with other connection units 1 through flange bolt four 23 until the experimental requirements are met. After reaching the experimental length of the sand column, before placing the grout injection structure, gravel is laid in the reserved space created by sidewall 17 of the grout exit structure, both the grout injection structure and the grout exit structure need to lay a gravel layer within, and the gravel of the grout exit structure is pre-placed in the compression piston 26. There are two reasons for this setting, on the one hand, let the grout evenly input and output sand column, on the other hand, prevent fine sand from flowing out of the output hole, block the grout output port. Then sand can be filled with the sand column, if sensor need to be arranged, the sensor wire can pass through reservation hole 14, and then use glue or other material to seal, if you do not need to place the sensor, just directly seal the hole.

After filling the sand column, the screw 4 is then put into the grout exit structure at the bottom through the reserved hole for screw 21, and then the grout injection structure is placed so that the other end of the screw 4 is can penetrate into the grout injection structure through the reserved hole for screw one 21, and the screw 4 is fixed by applying fixing bolts 5 at both ends.

After the experimental device is assembled and filled with sand, the drive equipment (generally air compressor) is used to inject the grout from the grout into the grout injection port 20 of the structure, and the grout is collected at the grout exit 27, the grout input rate, water-cement ratio, etc. according to the experimental requirements by the experimenter at his own discretion, due to the setting of the grout exit structure, the sand column can be placed on the scale as a whole for weighing test.

In the actual project, the soil located at different depths will be subjected to different in-situ stresses, and under the action of this force produces different degrees of compression consolidation, the device in order to simulate this working condition, set up a sand column consolidation structure, grout exit structure and gravel layer is placed on the movable lifting platform 28, the grout flows out of the structure through the grout exit, the lifting platform 28 is controlled by the inner rotating arm 31 and the outer rotating arm 32, by controlling the rotation of the rotating handle 44, controlling the lifting table to control the rotation of the screw 45, close or far the distance between the top pulley 36 to the fixing clamp block one 35 and the bottom pulley 34 to the fixing clamp block two 37 to realize the rise and fall of the lifting platform 28, and realize the displacement of the sand column consolidation structure by rotating the number of rotation turns of the handle 44. Install the jack pressure system 30, when force control is required, the bolt is removed, the jack is used to provide a certain consolidation stress, and the sand column is applied through the platform, so the sand column consolidation in two ways of displacement control and force control is realized.

Figure 18:
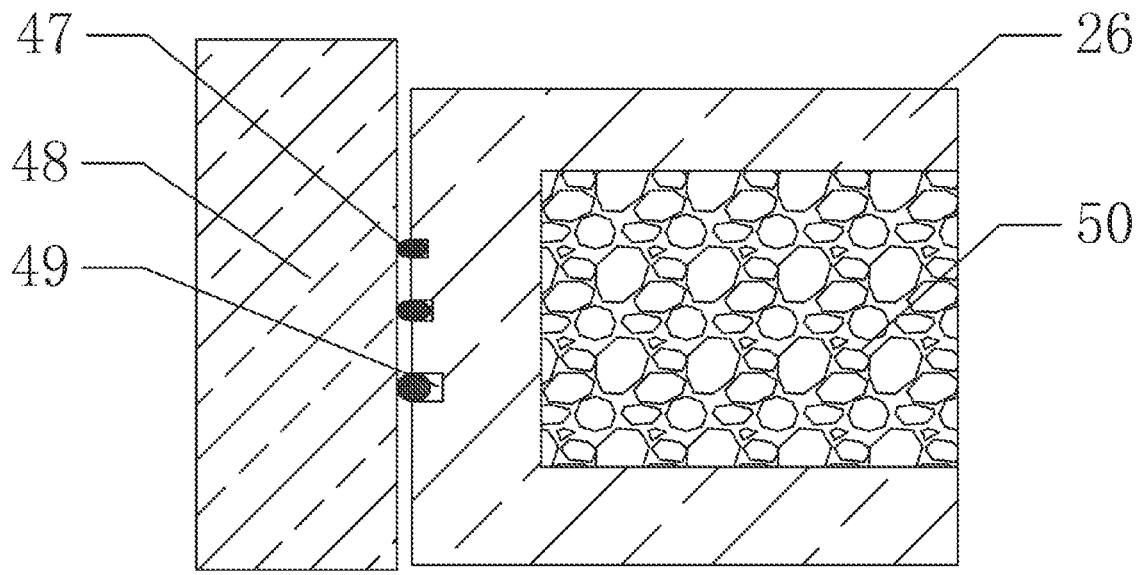
FIG. 18 is the detail diagram of sand column side wall and the base gravel layer contact position.

FIG. 18 is a detailed diagram of the contact position of the gravel layer 50 in the compression piston 26 and the side wall of the sand column of the present invention, in order to ensure the consolidation effect of the sand column, holes are made on the sand column wall 48, and three rubber sealing rings 47 are placed, the installation position of the rubber sealing ring 49 is shown in the figure, to ensure the sealing effect of the mobile grout exit 27 on the sand column, and at the same time realize free sliding up and down.

After the completion of the grouting test, the grout exit 27 is blocked, the grout with in the sand column is cured, after the curing is completed, the flange bolts between the flange wheels are disassembled one by one from top to bottom, and the sand column is cut and isolated using a sharp steel plate, so as to obtain a sand column with different penetration conditions, and then collect data according to the needs of the experimenter.

Therefore, the present invention presents a sand column grouting filtration experimental device and application method of the above structure, and adopts a segmented combined sand column, which is suitable for segmented study of the interception and leaching effect of cement grout in the sand column in addition to ensuring the experimental results that can be obtained by the general sand column; The connecting unit of the present invention adopts the connection method of silicone pad and flange bolts, which ensures the gas tightness and overall strength of the assembled sand column, and reduces the error of the experimental results; The grout injection structure and grout exit structure of the present invention integrate the functions of dispersing grout, input and output of grout, and measuring platform, the flat platform is convenient for placing the entire equipment on the weighing platform for weight measurement; The connecting unit of the present invention is provided with a preset port for the sensor placement, which can be conveniently sealed with glass glue after threading, and is convenient for measuring the gradient distribution and change of various parameters inside the sand column during the test; The length of the sand column of the present invention can be freely determined by changing the number of connecting units, which is convenient for studying the changes of grout after different diffusion lengths; The present invention realizes two consolidation methods of sand column: displacement control and force control, through the consolidation control device, so that the sand column is in more compliant with the characteristics of actual engineering, and more accurate experimental result can be obtained.

Finally, it should be noted that the above embodiments are only used to illustrate the technical solution of the present invention and not to limit it, although the present invention is described in detail with reference to the better embodiment, those of ordinary skill in the art should understand: it may still modify or replace the technical solution of the present invention, and these modifications or equivalent replacements can not make the modified technical solution depart from the spirit and scope of the technical solution of the present invention.

What is claimed is:

1. A sand column grouting filtration experimental device, comprising a sand column, a grout injection structure connected above the sand column and a grout exit structure connected below the sand column, wherein the sand column comprises a plurality of connecting units, and a sealing silicone pad is provided between two connecting units of the plurality of connecting units; between the plurality of the connecting units, between each of the plurality of connecting units and the grout injection structure, between each of the plurality of connecting units and the grout exit structure are connected by flange bolts; four screws are provided around the sand column, the four screws run through the grout injection structure and the grout exit structure, and both ends of the four screws are provided with fixing bolts; a bottom plate is provided below the grout exit structure, the bottom plate and the grout exit structure are provided with a first support plate and a second support plate, and the first support plate and the second support plate are provided with a sand column consolidation structure.

2. The sand column grouting filtration experimental device according to claim 1, wherein each of the plurality of connecting units comprises a first flange and a second flange, wherein the first flange and the second flange are provided with a plurality of first flange bolt holes, the second flange and the first flange are provided with side wall plates, and each of the side wall plates is provided with a reservation hole for sensor wire; the sealing silicone pad is provided with a plurality of second flange bolt holes.

3. The sand column grouting filtration experimental device according to claim 2, wherein the grout injection structure comprises a sealing plate and a wall for space reservation disposed below the sealing plate, wherein the wall is provided with a plurality of third flange bolt holes, the wall is connected to the first flange by a third flange, a central position of the sealing plate is provided with a grout injection port, and a surrounding position of the sealing plate is provided with four first reserved holes for screw.

4. The sand column grouting filtration experimental device according to claim 3, wherein the grout injection structure comprises an exit-end platform disposed below the plurality of connecting units, and the exit-end platform is connected to the second flange by a fourth flange; a central position of the exit-end platform is provided with a through channel, and the exit-end platform is provided with four second reserved holes for screw at a surrounding position.

5. The sand column grouting filtration experimental device according to claim 4, wherein the sand column consolidation structure comprises a compression piston and a grout outlet disposed below the compression piston, wherein a lower part of the grout outlet is connected to a lifting platform, a lower part of the lifting platform is provided with a bottom platform, the bottom platform and the lifting platform are provided with a jack pressure system, each of a front side and a rear side of the jack pressure system are provided with an inner rotating arm and an outer rotating arm, and the outer rotating arm and the inner rotating arm are connected by a bolt shaft; a bottom of both sides of the bottom platform is provided with a bottom pulley and a first fixing clamp block, a top of both sides of the lifting platform is provided with a top pulley and a second fixing clamp block, a first end of the inner rotating arm is connected to the top pulley by a first pulley shaft, a second end of the inner rotating arm is connected to the first fixing clamp block by a first fixed end bolt shaft, a first end of the outer rotating arm is connected to the bottom pulley through a second pulley shaft, and a second end of the outer rotating arm is connected to the second fixing clamp block by a second fixed end bolt shaft.

6. The sand column grouting filtration experimental device according to claim 5, wherein a left side and a right side of the lifting platform are respectively provided with a first steel plate stopper and a second steel plate stopper, the first steel plate stopper is provided with a rotating handle at a center position, and the rotating handle is connected to the first steel plate stopper by a first lifting platform controller screw; a center position of the second steel plate stopper is provided with a second lifting platform controller screw.

7. A use method of the sand column grouting filtration experimental device according to claim 6, comprising following steps:
   step 1: select a number of connecting units according to requirements of an experiment, combine the plurality of connecting units through flange bolts to form a complete sand column, and then connect the grout injection structure, the sand column and the grout exit structure through flange bolts, and place the compression piston at a bottom of the sand column;
   step 2: put sand into the sand column, through a sensor threading reservation hole on each of the plurality of connecting units, place a sensor as needed, and seal the sensor threading reservation hole after placing the sensor;
   step 3: according to the requirements of the experiment, adjust the compression piston, compress and consolidate the sand column, the lifting platform has a displacement control mode and a force control mode to control a compression of the sand column with rated values;
   step 4: use a sealing joint to connect an air compressor, a grout storage tank and the grout injection port on the sealing plate in turn, install a ball valve on a grout transportation pipeline to control a flow of a cement grout from the grout storage tank, and check a gas tightness;
   step 5: turn on the air compressor, drive air into the grout storage tank, and the cement grout from the grout storage tank enters the sand column along the grout transportation pipeline under an action of air pressure;

step 6: drive the cement grout to infiltrate into the sand column, monitor a sensor value and a change of sand column weight according to the requirements of the experiment, after the cement grout is filtered through the sand column, a quantitative container is used to collect a filtrate and measure a turbidity of the filtrate; and step 7: after the cement grout seeps through, the experiment is completed, the sand column grouting filtration experimental device is disassembled from top to bottom, and during a disassembly process, a pad plate is inserted into the sand column for segmentation when a segment is separated, and then a follow-up test is carried out to study a percolation of the cement grout at different diafiltration distances.

* * * * *